US011412134B2

(12) United States Patent
Tolman et al.

(10) Patent No.: US 11,412,134 B2
(45) Date of Patent: Aug. 9, 2022

(54) UNDERWATER DIGITAL CAMERA SYSTEMS

(71) Applicant: LADUMA, INC., Salt Lake City, UT (US)

(72) Inventors: Dorian T. G. Tolman, Salt Lake City, UT (US); Skyler Alan Baird, Murray, UT (US)

(73) Assignee: LADUMA, INC., Salt Lake City, UT (US)

(*) Notice: Subject to any disclaimer, the term of this patent is extended or adjusted under 35 U.S.C. 154(b) by 0 days.

(21) Appl. No.: 15/826,582

(22) Filed: Nov. 29, 2017

(65) Prior Publication Data
US 2018/0152637 A1    May 31, 2018

Related U.S. Application Data

(60) Provisional application No. 62/427,941, filed on Nov. 30, 2016.

(51) Int. Cl.
*H04N 5/232* (2006.01)
*G03B 17/56* (2021.01)
(Continued)

(52) U.S. Cl.
CPC ......... *H04N 5/23238* (2013.01); *G03B 17/08* (2013.01); *G03B 17/561* (2013.01);
(Continued)

(58) Field of Classification Search
CPC ........ G03B 17/00; G03B 17/08; G03B 17/56; G03B 17/561; G03B 17/563;
(Continued)

(56) References Cited

U.S. PATENT DOCUMENTS 6,097,424 A * 8/2000 Zernov .................... H04N 9/47
348/373
6,141,034 A * 10/2000 McCutchen ........... G02B 27/22
348/36
(Continued)

FOREIGN PATENT DOCUMENTS

WO    2016055688 A1    4/2016

OTHER PUBLICATIONS 3-in-1 IP68 Waterproof Diving Photography Kit With Floating Handle Grip For GoPro / iPhone 6S 6, TVC-Mall, Online Video, Jul. 25, 2016 (retrieved Feb. 19, 2019), https://www.youtube.com/watch?v=ENU0Z5myOyl, 3 pages. (Year: 2016).*
(Continued)

*Primary Examiner* — Christopher S Kelley
*Assistant Examiner* — Ana Picon-Feliciano
(74) *Attorney, Agent, or Firm* — Loza & Loza, LLP; Tyler J. Barrett

(57) ABSTRACT

Video recording system assemblies are adapted to facilitate capture of 360° images. According to one example, a video recording system assembly may include a frame, including a first vertical mount located at a first vertical end, a second vertical mount located at a second vertical end opposite from the first vertical end, and a horizontal mount located between the first vertical mount and the second vertical mount. At least one digital video camera and/or camera enclosure may be coupled to the first vertical mount. Similarly, at least one digital video camera and/or camera enclosure may be coupled to the second vertical mount. Six digital video cameras and/or camera enclosures may be coupled to the horizontal mount in a triangular configuration, with two digital video cameras and/or camera enclosures on each side. Other aspects, embodiments, and features are also included.

20 Claims, 12 Drawing Sheets

(51) Int. Cl.
  *G03B 37/04* (2021.01)
  *H04N 5/225* (2006.01)
  *H04N 13/243* (2018.01)
  *G03B 17/08* (2021.01)
  *H04N 5/247* (2006.01)

(52) U.S. Cl.
  CPC ............ *G03B 37/04* (2013.01); *H04N 5/2252* (2013.01); *H04N 5/2253* (2013.01); *H04N 5/22521* (2018.08); *H04N 13/243* (2018.05); *H04N 5/247* (2013.01); *H04N 2213/001* (2013.01)

(58) Field of Classification Search
  CPC ...... G03B 17/568; G03B 35/00; G03B 35/08; G03B 35/12; G03B 37/00; G03B 37/04; H04N 13/00; H04N 13/003; H04N 13/0055; H04N 13/243; H04N 2213/00; H04N 2213/001; H04N 5/222; H04N 5/225; H04N 5/2251; H04N 5/2252; H04N 5/22521; H04N 5/2253; H04N 5/23238; H04N 5/247; F16M 11/00; F16M 11/02; F16M 11/04; F16M 13/00; F16M 13/04
  USPC .......................................................... 348/38
  See application file for complete search history.

(56) References Cited

U.S. PATENT DOCUMENTS

| | | | | |
|---|---|---|---|---|
| 9,204,041 | B1* | 12/2015 | Campbell | H04N 13/239 |
| 2011/0211164 | A1* | 9/2011 | Monroe | F16M 11/14 |
| | | | | 352/243 |
| 2014/0104479 | A1* | 4/2014 | Samuels | G03B 17/55 |
| | | | | 348/335 |
| 2014/0153916 | A1* | 6/2014 | Kintner | G03B 17/561 |
| | | | | 396/419 |
| 2015/0348580 | A1* | 12/2015 | van Hoff | G11B 19/20 |
| | | | | 348/38 |
| 2016/0150156 | A1* | 5/2016 | Okumura | H04N 5/2253 |
| | | | | 348/36 |
| 2016/0212409 | A1* | 7/2016 | Cole | H04N 13/0022 |
| 2017/0227841 | A1* | 8/2017 | Niemela | G02B 13/06 |
| 2017/0295324 | A1* | 10/2017 | Cabral | H04N 13/243 |
| 2017/0322396 | A1* | 11/2017 | Burtey | G02B 13/06 |
| 2018/0321580 | A1* | 11/2018 | Niewohner | G03B 37/04 |

OTHER PUBLICATIONS

Kintner, Product Details For The 360Abyss™ v4, 360Rize, Online Article, Jul. 1, 2016, https://www.360rize.com/2016/07/360abyss/, 13 pages. (Year: 2016).*

3-in-1 IP68 Waterproof Diving Photography Kit With Floating Handle Grip For GoPro / iPhone 6S 6, TVC-Mall, Online Video, Jul. 25, 2016 (retrieved Jan. 26, 2018), https://www.youtube.com/watch?v=ENU0Z5myOyI, 2 pages.

Kintner, Product Details For The 360Abyss™ v4, 360Rize, Online Article, Jul. 1, 2016, (retrieved Jan. 26, 2018) https://www.360rize.com/2016/07/360abyss/, 13 pages.

WIPO, International Search Report and Written Opinion issued in counterpart Application No. PCT/US2017/064034, dated Feb. 15, 2018, 13 pages.

* cited by examiner

UNDERWATER DIGITAL CAMERA SYSTEMS

PRIORITY CLAIM

The present Application for Patent claims priority to Provisional Application No. 62/427,941 entitled "Underwater Stereoscopic 360 Degree Digital Camera Systems" filed Nov. 30, 2016, and assigned to the assignee hereof and hereby expressly incorporated by reference herein.

TECHNICAL FIELD

The technology discussed below relates generally to recording devices, and more specifically to stereoscopic digital camera systems for capturing 360 degrees of three-dimensional imagery.

BACKGROUND

Recently, virtual reality has become popular in many applications. Virtual reality generally refers to generating realistic images, sounds and other sensations to replicate a real environment or an imaginary setting, and simulate a user's physical presence in this environment to enable the user to interact with this space. A person having virtual reality equipment is typically able to "look around" the generated world, move about in it, and interact with features or items that are depicted. Modernly, a user may interact with a virtual reality environment through a virtual reality viewer display, such as a computer monitor, a projector screen, or a virtual reality headset (or head-mounted display, which may include glasses, goggles, or other similar configurations).

In some implementations, virtual reality media may be generated by capturing video and/or photographs of a real-world environment. For example, a virtual reality video camera system may capture video of a location or event. The captured video can be subsequently processed to enable a user to view and interact with the location or event as if they are actually present at the location or event. Some locations may be underwater. Accordingly, it is desirable to provide camera systems capable of recording stereoscopic 360 degree images for use in virtual reality applications.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Various examples and implementations of the present disclosure facilitate capturing of 360° images from a plurality of digital cameras. One or more aspects of the present disclosure relate to 360° video recording system assemblies capable of capturing monoscopic and stereoscopic recordings. In at least one embodiment, such assemblies may include a frame, including a first vertical mount located at a first vertical end, a second vertical mount located at a second vertical end opposite from the first vertical end, and a horizontal mount located between the first vertical mount and the second vertical mount. At least one digital video camera may be coupled to the first vertical mount. At least one digital video camera may be coupled to the second vertical mount. Six digital video cameras may be coupled to the horizontal mount in a triangular configuration, with two digital video cameras on each side.

In one or more additional embodiments, such assemblies may include a frame, including a first vertical mount located at a first vertical end, a second vertical mount located at a second vertical end opposite from the first vertical end, and a horizontal mount positioned between the first vertical mount and the second vertical mount. At least one waterproof camera enclosure may be coupled to the first vertical mount. At least one waterproof camera enclosure may be coupled to the second vertical mount. Six waterproof camera enclosures may be coupled to the horizontal mount in a triangular configuration, with two waterproof camera enclosures on each side.

Additional aspects of the present disclosure include methods of capturing 360° digital images. According to at least one embodiment, such methods may include coupling at least one digital video camera to a first vertical mount of a frame, where the at least one video camera coupled to the first vertical mount is directed upward. At least one digital video camera may be coupled to a second vertical mount of the frame, where the at least one digital video camera coupled to the second vertical mount is directed downward. Six digital video cameras may be coupled to a horizontal mount of the frame in a triangular configuration with two digital video cameras on each side. Images may be simultaneously captured on each digital video camera.

Still further aspects of the present disclosure include methods of making stereoscopic 360° video recording systems. According to one or more embodiments, such methods may include forming a first vertical mount positioned at a first vertical end of a frame, a second vertical mount positioned at a second vertical end opposite from the first vertical end of the frame, and a horizontal mount with a triangular configuration, the horizontal mount positioned between the first vertical mount and the second vertical mount.

Other aspects, features, and embodiments associated with the present disclosure will become apparent to those of ordinary skill in the art upon reviewing the following description in conjunction with the accompanying figures.

DRAWINGS

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The illustrations presented herein are, in some instances, not actual views of any particular stereoscopic 360° video recording system, video camera, or stereoscopic 360° video recording system assembly, but are merely idealized representations which are employed to describe the present disclosure. Additionally, elements common between figures may retain the same numerical designation.

Figure 1:
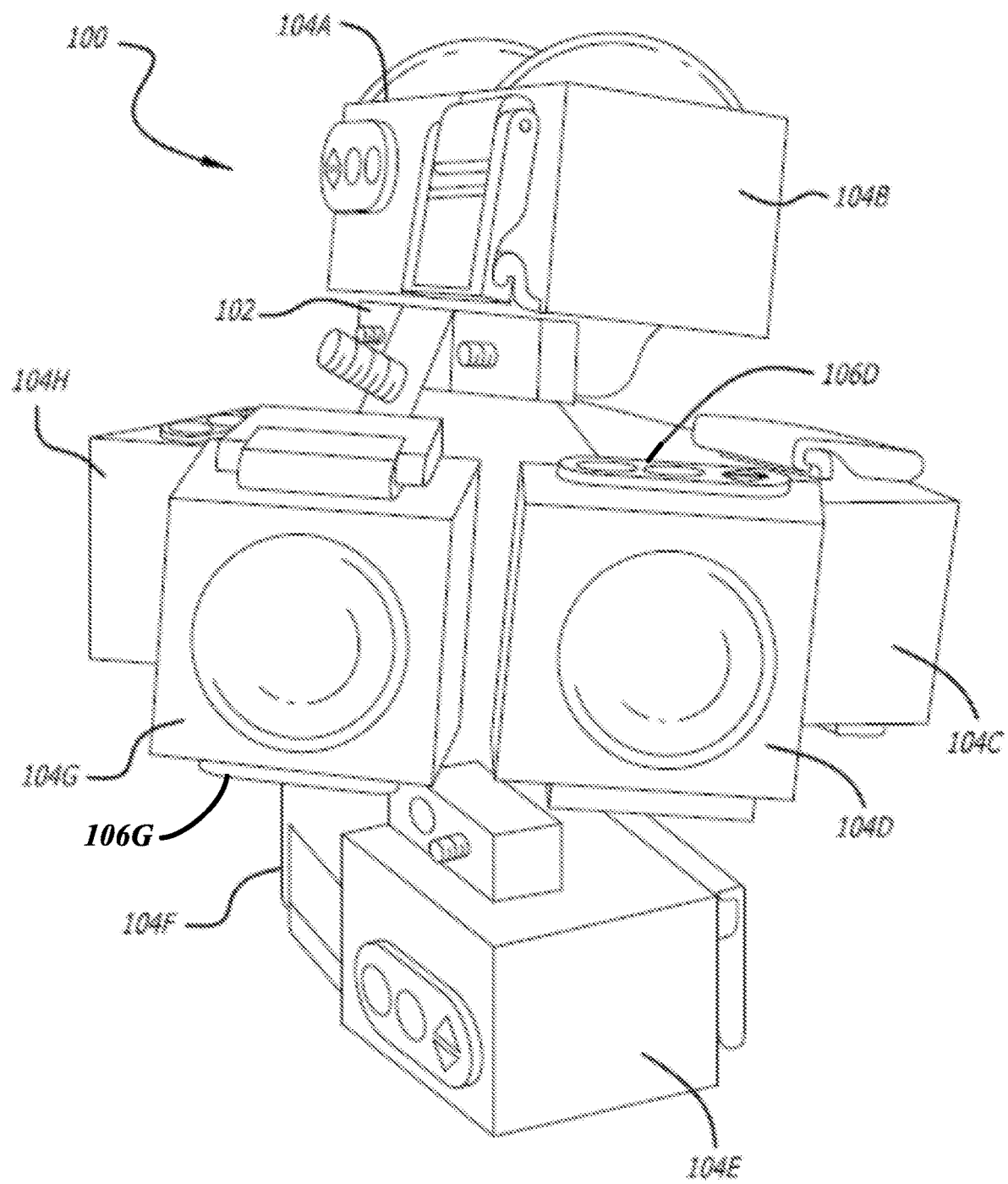
FIG. 1 is an isometric view of a stereoscopic 360° video recording system assembly according to at least one example.

Various embodiments of the present disclosure include stereoscopic 360° video recording systems and assemblies. In general, system assemblies of the present disclosure include a frame and a plurality of digital video cameras and/or camera enclosures coupled to the frame. Referring to FIG. 1, an isometric view of a stereoscopic 360° video recording system assembly 100 is shown according to at least one example of the present disclosure. The example of a system assembly 100 in FIG. 1 includes a frame 102 and ten (10) digital video cameras (not shown) and/or camera enclosures 104 coupled to the frame 102 (camera enclosures 104A-104H are visible in FIG. 1, and additional camera enclosures are not visible but are included in this example). In the example depicted in FIG. 1, the system assembly 100 includes two (2) camera enclosures 104A, 104B directed generally upward and two (2) camera enclosures 104E, 104F directed generally downward.

Figure 2:
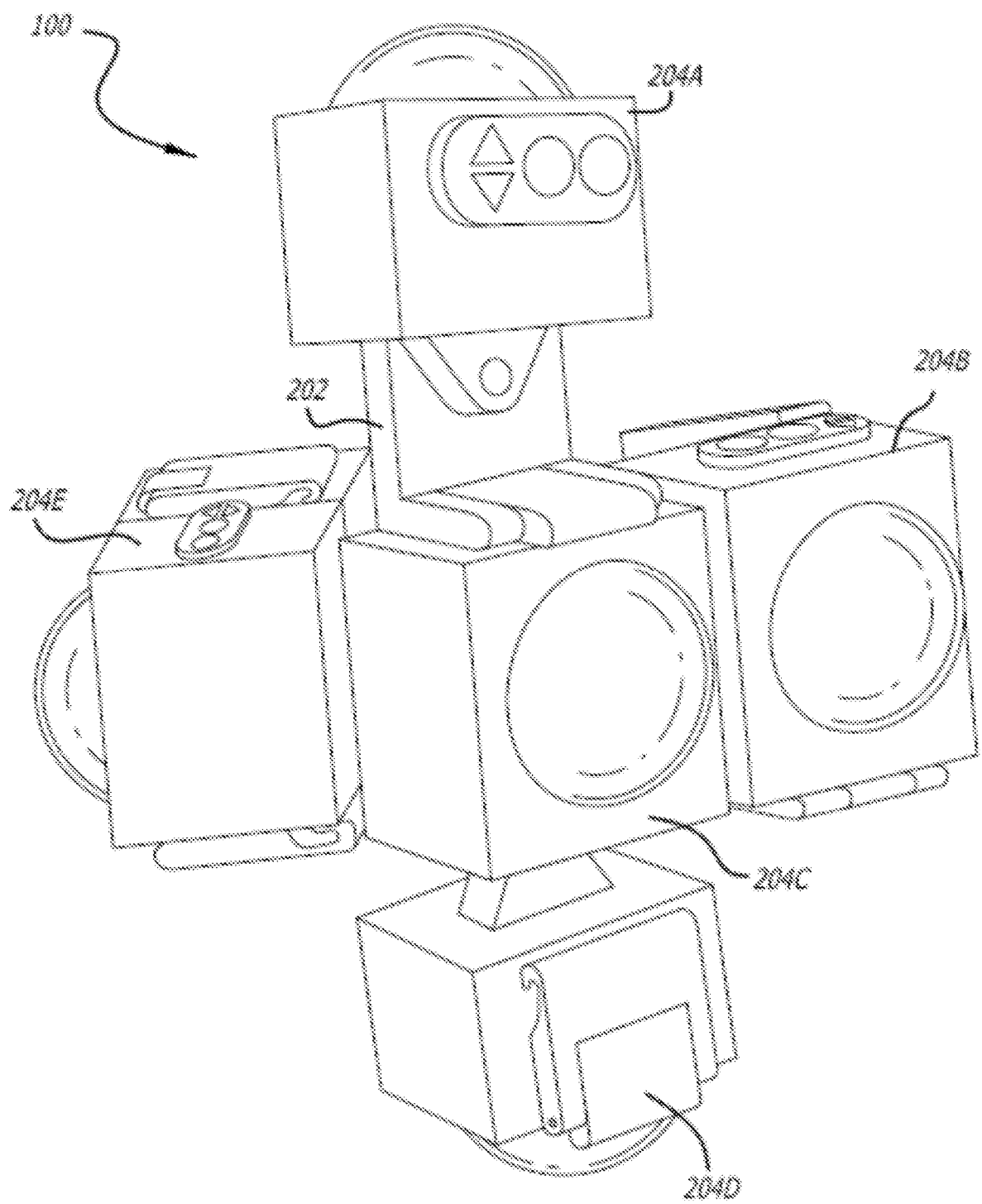
FIG. 2 is an isometric view of a stereoscopic 360° video recording system assembly according to at least one other embodiment.

FIG. 2 shows an isometric view of a stereoscopic 360° video recording system assembly 100 according to another embodiment utilizing just eight (8) digital video cameras (not shown) and/or camera enclosures 204 coupled to the frame 202 (camera enclosures 204A-204E are visible in FIG. 2, and additional camera enclosures are not visible but are included in this example). As depicted, the system assembly 100 in FIG. 2 includes just one (1) camera enclosure 204A directed generally upward and one (1) camera enclosure 204D directed generally downward.

In the examples depicted in FIGS. 1 and 2, camera enclosures 104/204 are shown. In some embodiments where camera enclosures 104/204 are employed with the digital video cameras, a desiccant material may be positioned within each camera enclosure 104/204 to sustain a state of dryness within the camera enclosures 104/204. The desiccant can aid in avoiding fogging in the camera enclosure 104/204 during use at various ambient temperatures.

Furthermore, in such embodiments utilizing camera enclosures 104/204, a heat-conductive material may be positioned within each camera enclosure 104/204 to fill air gaps between a respective digital video camera and the camera enclosure 104/204. Such material can facilitate heat transfer from the digital video cameras to the walls of the camera enclosure 104/204, aiding in the cooling of the digital video cameras. In particular, heat from the digital video cameras can transfer from the digital video camera through the heat-conductive material, to the walls of the camera enclosure 104/204, and can finally be dissipated into the water surrounding the camera enclosures 104/204 during use.

Figure 3:
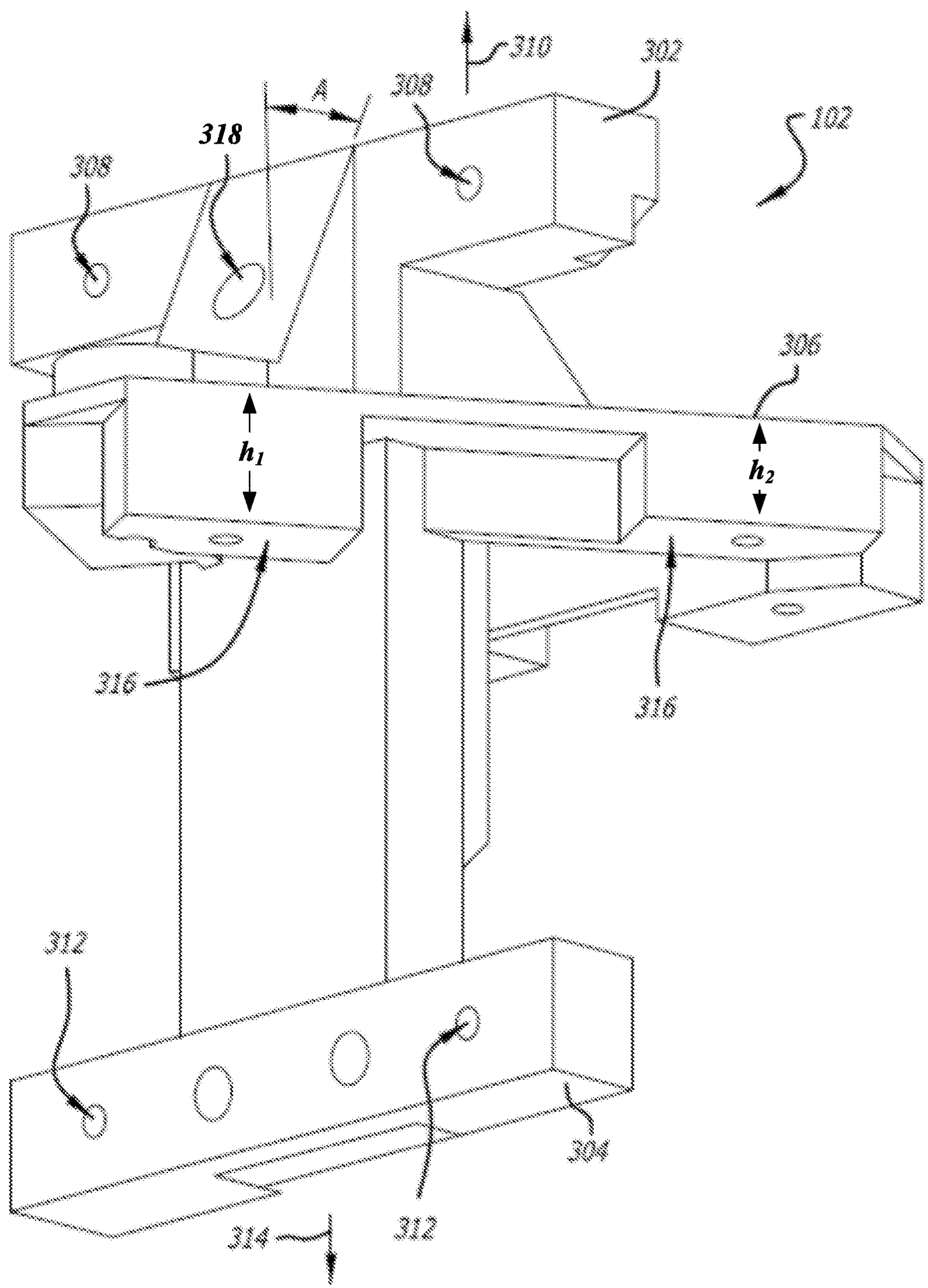
FIG. 3 is an isometric view of a frame according to at least one embodiment.

The frame 102/202 is configured to mount each of the camera enclosures 104/204 in a specific orientation. FIG. 3 is an isometric view of a frame 102 according to at least one example such as the embodiment depicted in FIG. 1. As shown, the frame 102 includes a first vertical mount 302 located at a first vertical end, a second vertical mount 304 located at a second vertical end opposite from the first vertical end, and a horizontal mount 306 located between the first vertical mount 302 and the second vertical mount 304.

Generally, the first vertical mount 302 can be configured to be coupled with one or more water-proof camera enclosures and/or digital video cameras. In the example depicted in FIG. 3, the first vertical mount 302 is configured to couple two water-proof camera enclosures (not shown) and/or two digital video cameras (not shown). For example, the embodiment shown in FIG. 3 includes two apertures 308 configured to facilitate coupling the two camera enclosures or digital video cameras to the first vertical mount 302. The first vertical mount 302 is further configured to couple the camera enclosures and/or digital video cameras so that each respective digital video camera coupled to the first vertical mount 302 or placed in a camera enclosure is oriented with its lens directed generally upward in the direction of arrow 310. For example, the water-proof camera enclosures 104A and 104B in FIG. 1 are shown being coupled to the first vertical mount 302 shown in FIG. 3.

Generally, the second vertical mount 304 can also be configured to be coupled with one or more water-proof camera enclosures and/or digital video cameras. In the example depicted in FIG. 3, the second vertical mount 304 is configured to couple two more water-proof camera enclosures (not shown) and/or two more digital video cameras (not shown). For example, the embodiment shown in FIG. 3 includes two apertures 312 configured to facilitate coupling the two camera enclosures or digital video cameras to the second vertical mount 304. The second vertical mount 304 is further configured to couple the camera enclosures and/or digital video cameras so that each respective digital video camera coupled to the second vertical mount 304 or placed in a camera enclosure is oriented with its lens directed generally downward in the direction of arrow 314.

As noted above with reference to FIG. 2, other embodiments of a frame can include a first vertical mount and a second vertical mount each configured to be coupled with just one water-proof camera enclosure and/or digital video camera.

The horizontal mount 306 is configured to couple six water-proof camera enclosures (not shown) and/or six digital video cameras (not shown). The horizontal mount 306 accordingly includes six mounting locations 316, each configured to couple a respective camera enclosure or digital video camera. In the depicted example, each of the mounting locations 316 includes a respective aperture configured to facilitate coupling a camera enclosure or digital video camera to the horizontal mount 306.

Figure 4:
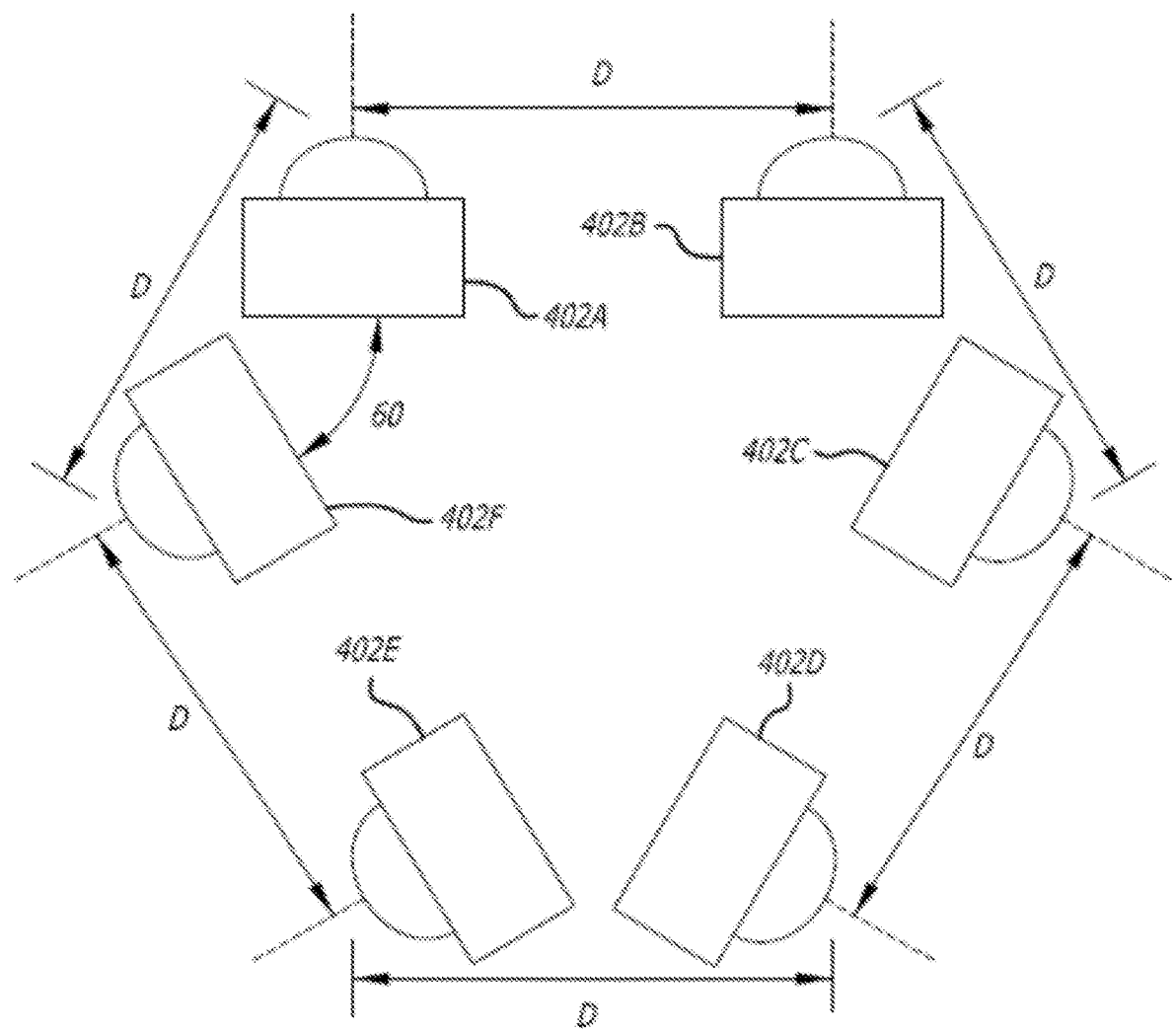
FIG. 4 illustrates a schematic top view of a digital video camera arrangement on the horizontal mount 206 according to at least one aspect of the present disclosure.

The horizontal mount 306 is formed with a generally triangular shape. For example, FIG. 4 illustrates a schematic top view of a digital video camera arrangement on the horizontal mount 306 according to at least one aspect of the present disclosure. As shown, six digital video cameras 402A, 402B, 402C, 402D, 402E, and 402F are shown in the triangular orientation of the horizontal mount 306 in FIG. 3. Each of the digital video cameras that are employed with the system assembly 100 can utilize an ultra-wide-angle lens to facilitate capture of photo and/or video images at a relatively wide angle. In at least one embodiment, the ultra-wide-angle lens of each digital video camera may be configured to capture images across a 220° field of view. In other embodiments, the ultra-wide-angle lens for each digital video camera may be configured to capture images across a field of view greater than 220°. The specific field of view for the lens utilized with each digital video camera is not limiting, and smaller fields of view may also be utilized with aspects of the present disclosure as desired by the user. The field of view for the lenses utilized may facilitate use of more or fewer digital video cameras. For example, a relatively lower field of view may result in more digital video cameras to fully capture the entire scene, while relatively large fields of view can facilitate fewer cameras to capture the entire scene. Further, in underwater environments where the system assembly 100 may be used, the effective field of view has been found by the inventors to be lower than the lens facilitates out of the water.

The horizontal mount 306 is configured so that each digital video camera can work in a stereo camera pair with one or more other digital video cameras. For example, the digital video camera 402A operates as the left side of a stereo camera pair with the digital video camera 402B, and operates as the right side of a stereo camera pair with the digital video camera 402F. The ultra-wide-angle lens enables the digital video cameras 402A and 402F to capture overlapping imagery to enable the two digital video cameras to operate as a stereo camera pair, even though they are facing in considerably different directions in the triangular setup described and depicted. The images captured by each stereo camera pair may later be used to display a left screen and a right screen for a viewer. For example, a user viewing the captured images may view the imagery captured by the left side of a stereo camera pair (e.g., from digital video camera 402A, 402C, 402E) with their left eye, and the imagery captured by the right side of the stereo camera pair (e.g., from digital video camera 402B, 402D, 402F) with their right eye to create a three-dimensional image viewable by the user. In some implementations, a virtual reality viewer display is employed, with a first screen configured to expose the left eye to the imagery captured by the left side of a stereo camera pair, and a second screen configured to expose the right eye to the imagery captured by the right side of a stereo camera pair. In other implementations, other viewing options may be employed to isolate the images to the respective eyes, such as 3D glasses, as known generally in the art.

According to at least one embodiment of the present disclosure, the interaxial (also known as "interocular") separation between any adjacent digital video cameras on the horizontal mount 306 is at least substantially the same. For example, referring still to FIG. 4, the distance between the center of the lenses for digital video cameras 402A and 402B is at least substantially equal to D. Additionally, the distance between the center of the lenses for digital video cameras 402A and 402F is also at least substantially equal to D. According to various embodiments, the distance D may be selected as desired. Often, the distance D has been conventionally suggested to be 65-68 millimeters, and the distance D can accordingly be selected as such in one or more embodiments. In at least one embodiment of the present disclosure, however, the distance D is configured to be 62 mm In one or more other embodiments, the interaxial separation between digital video cameras on the same side of the triangular shape of the horizontal mount 306 may be a first value, while the interaxial separation between adjacent digital video cameras on different sides of the triangular shape may be a second value that is greater than the first value. For example, the distance D between digital video cameras 402A and 402B may be a first value. Similarly, the distance D between digital video cameras 402C and 402D, and the distance D between digital video cameras 402E and 402F can also be the first value. The distance D between the digital video cameras 402A and 402F, however, can be the second value that is greater than the first value. Similarly, the distance D between digital video cameras 402E and 402D, and digital video cameras 402B and 402C can be the second value. Typically, the second value is determined as a result of the size of the digital video cameras. In at least one example, the first value is selected from a range between about 62 mm and 68 mm, and the second value is greater than the first value as a result of the size and shape of the digital video cameras (e.g., 75 mm-100 mm). In at least one embodiment, the first value may be 62 mm and the second value may be 82 mm In one or more other embodiments, the first value may be 65 mm and the second value may be 95 mm In one or more embodiments, the second value is selected to be as close to the first value as the physical size and shape of the digital video cameras will permit.

In the example in FIGS. 1 and 3 utilizing two digital video cameras on each of the first vertical mount 302 and the second vertical mount 304, the interaxial separation between the digital video cameras forming the stereo camera pair on the first vertical mount 302, and between the digital video cameras forming the stereo camera pair on the second vertical mount 304 can be set at least substantially to the same distance D. That is, the distance between the digital video cameras forming the stereo camera pair on the first vertical mount 302 can be at least substantially equal to D, and similar spacing can be utilized between the digital video cameras forming the stereo camera pair on the second vertical mount 304. In embodiments utilizing the first value and the second value, as described above, the interaxial separation between these two pairs on the first vertical mount 302 and the second vertical mount 304 may be set to the first value.

In the example in FIG. 2 utilizing just one digital video camera on each of the first vertical mount and the second vertical mount, the digital video cameras can be formed into stereo camera pairs with one or more of the digital video cameras coupled to the horizontal mount. That is, the digital video cameras coupled to the first and second vertical mounts can form stereo camera pairs with any of the digital video cameras on the horizontal mount.

Figure 5:
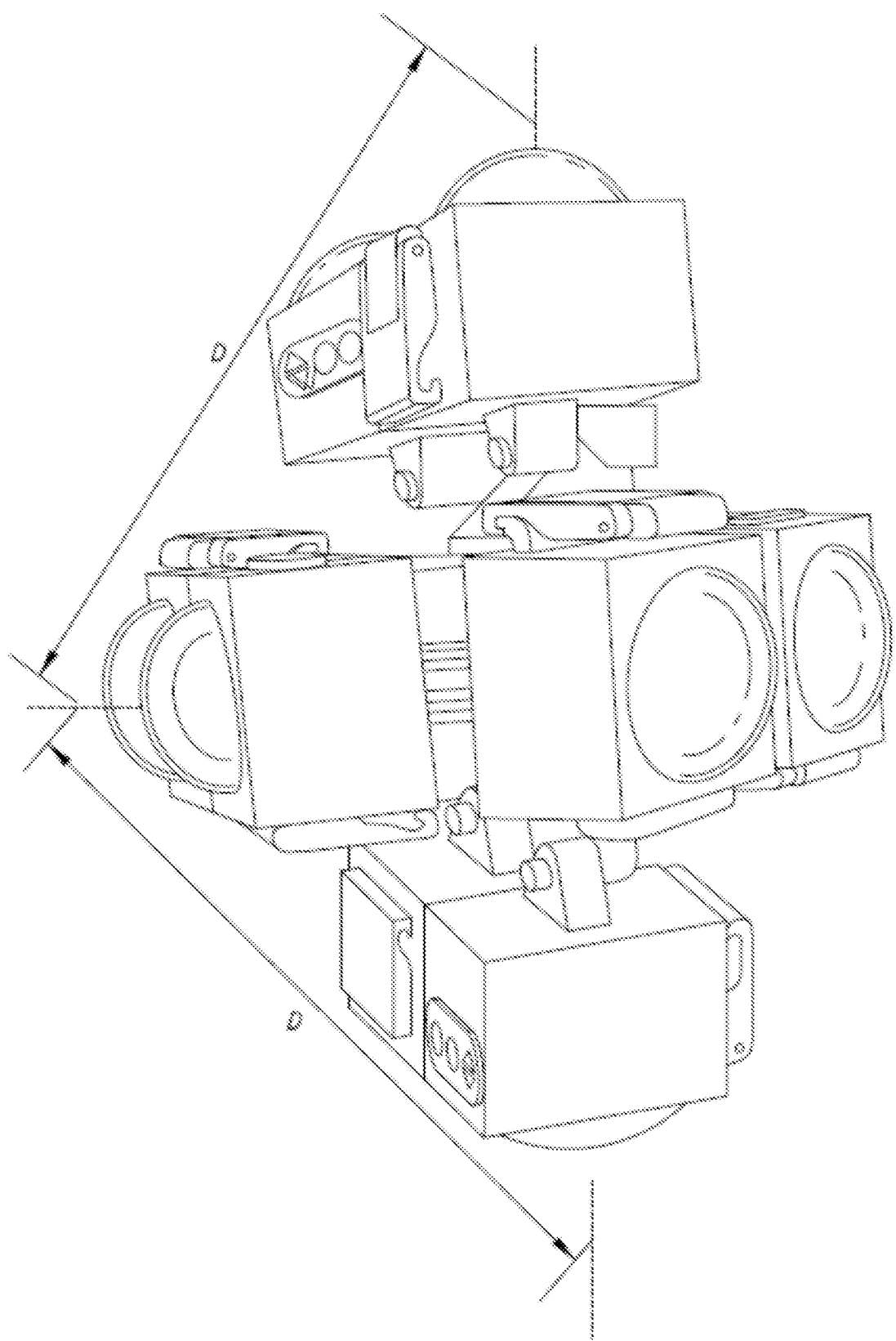
FIG. 5 is an isometric view of the stereoscopic 360° video recording system assembly from FIG. 1 at a different angle.

According to further aspects of the disclosure, the system assembly 100 can be further sized and configured so the interaxial separation between the one or more digital video cameras on the first vertical mount 302 and the nearest digital video camera(s) on the horizontal mount 306 can be at least substantially equal to the distance D, as shown by FIG. 5. Similar spacing can also be included for the one or more digital video cameras on the second vertical mount 304 and the horizontal mount 306, as also shown by FIG. 5. In various embodiments, the distance D may be at least substantially equal to the first value, the second value, or a third value.

According to an aspect of the present disclosure, the digital video cameras are mounted in the system assembly 100 either directly to the frame 102 or within respective camera enclosures 104/204 so that each stereo camera pair has a first digital video camera turned one way, and a second digital video camera of the stereo pair turned upside-down relative to the first digital video camera. This can be seen in FIG. 1 where a first camera enclosure 104D is shown with control buttons 106D located at the top thereof, and a second camera enclosure 104G is shown with the control buttons 106G located at the bottom thereof. Similar alternating configurations can be found with the digital video cameras mounted to the first vertical mount 302 and to the second vertical mount 304. The upside-down orientation of the digital video cameras can enable the user to access the buttons more easily for each digital video camera and to more easily view any screen that the digital video camera may include.

To accommodate the alternating configurations with digital video cameras mounted in the described upside-down orientation, the frame 102 can include mounting surfaces of different relative heights. For example, FIG. 3 shows an example where the mounting surface of mounting locations 316 in FIG. 3 are at different heights. This can be employed to facilitate mounting the digital video cameras in upside-down orientation, while keeping the center axis of each digital video camera lens at least substantially aligned with the other digital video camera(s) with which it is paired as a stereo camera pair. For example, the center axis of each digital video camera lens mounted to the horizontal mount 306 can be positioned within a common horizontal plane even while employing the described upside-down orientation.

According to an aspect of the disclosure, employing just six digital video cameras on the horizontal mount 306 together with one or two digital video cameras on each of the first vertical mount 302 and second vertical mount 304 (e.g., eight or ten total digital video cameras) can facilitate high quality 360° images with reduced post-processing. That is, post-processing typically includes combining the images captured from each individual camera into a single 360° image. By reducing the number of digital video cameras employed compared to conventional recording systems, the quantity of post-processing is significantly reduced. The digital video cameras can be any digital video camera available that may be configured to have the desired field of view, either off the shelf or by coupling a lens to the digital video camera. In embodiments where the digital video camera is not water proof, the use of water-proof camera enclosures, such as camera enclosures 104/204, can be utilized to house the digital video cameras for underwater use.

Figure 6:
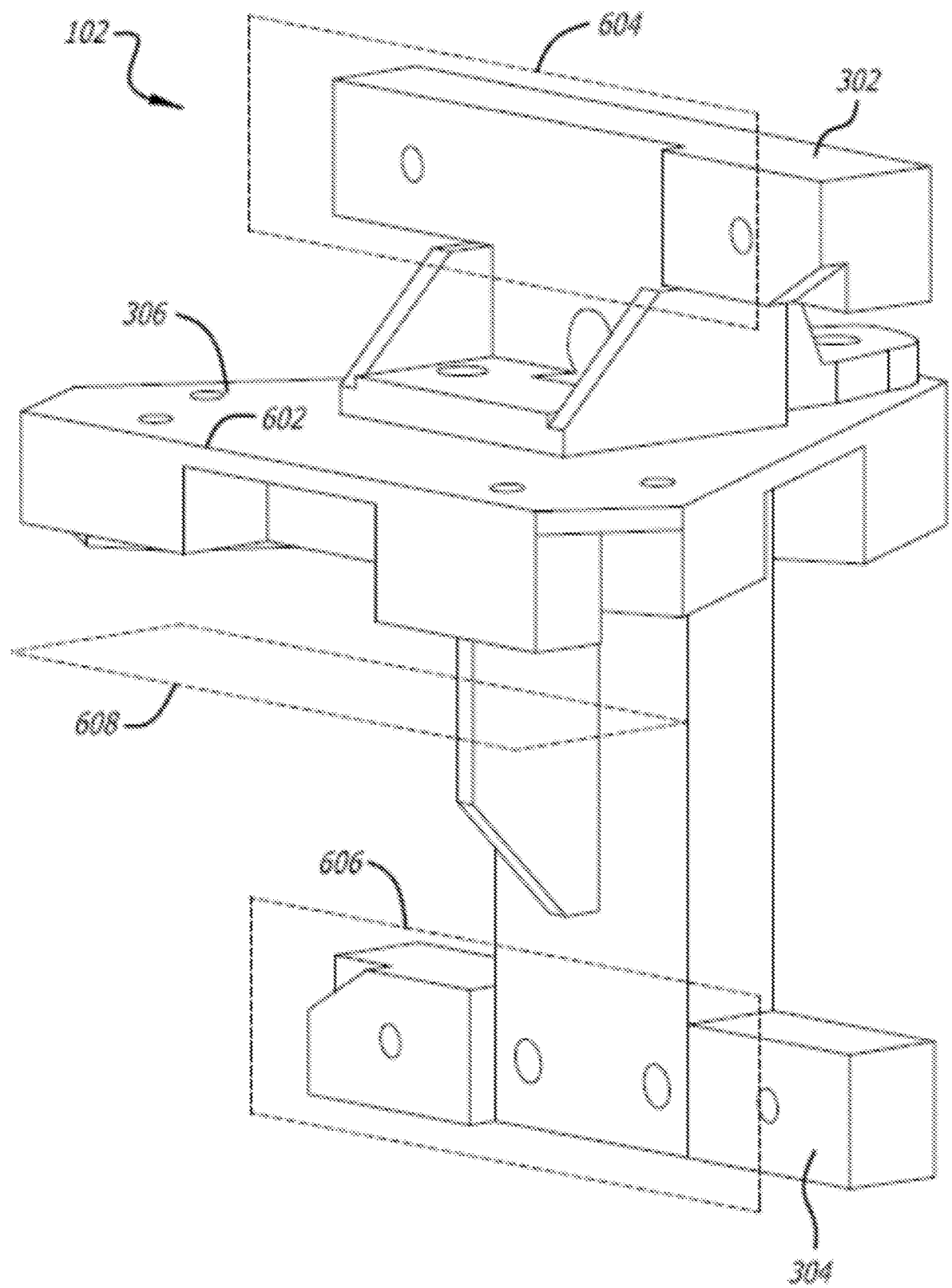
FIG. 6 is an isometric view of the frame from FIG. 3 depicted from a different angle.

According to at least one further aspect of the present disclosure, the frame 102 can be configured to position the stereo camera pair on the first vertical mount 302, the stereo camera pair on the second vertical mount 304, and one stereo camera pair on the horizontal mount 306 in parallel plains. For example, FIG. 6 is an isometric view of the frame 102 from FIG. 3 depicted from a different angle. From this view, it can be seen that the first vertical mount 302, the second vertical mount 304, and the side 602 of the horizontal mount 306 are all aligned. As a result, a first vertical plane 604 that is positioned to extend between the central axis of each lens for the digital video cameras mounted on the first vertical mount 302 is parallel to a second vertical plane 606 that is located to extend between the central axis of each lens for the digital video cameras mounted on the second vertical mount 304. In some embodiments, the first vertical plane 604 and the second vertical plane 606 may be the same vertical plane extending through the central axis of each lens for the digital video cameras mounted on both the first vertical mount 302 and the second vertical mount 304. Further, a horizontal plane 608 positioned to extend between the central axis of each lens for the digital video cameras mounted on the side 602 of horizontal mount 306 is orthogonal to the first and second vertical planes 604, 606.

In operation, the side 602 may represent the front of the system assembly 100. Accordingly, a handle attachment feature may be included on the side opposite from the side 602, although other embodiments may position the handle attachment feature on other sides respective to the "front" of the system assembly 100. In FIG. 3, an example of a handle attachment feature 318 is shown. In this embodiment, the handle attachment feature 318 may be an aperture formed in a surface of the frame 102. According to an aspect of the disclosure, the handle attachment feature 318 may be angled at an angle 'A' from vertical. In at least one embodiment, the angle 'A' is between 20° and 40°.

Figure 7:
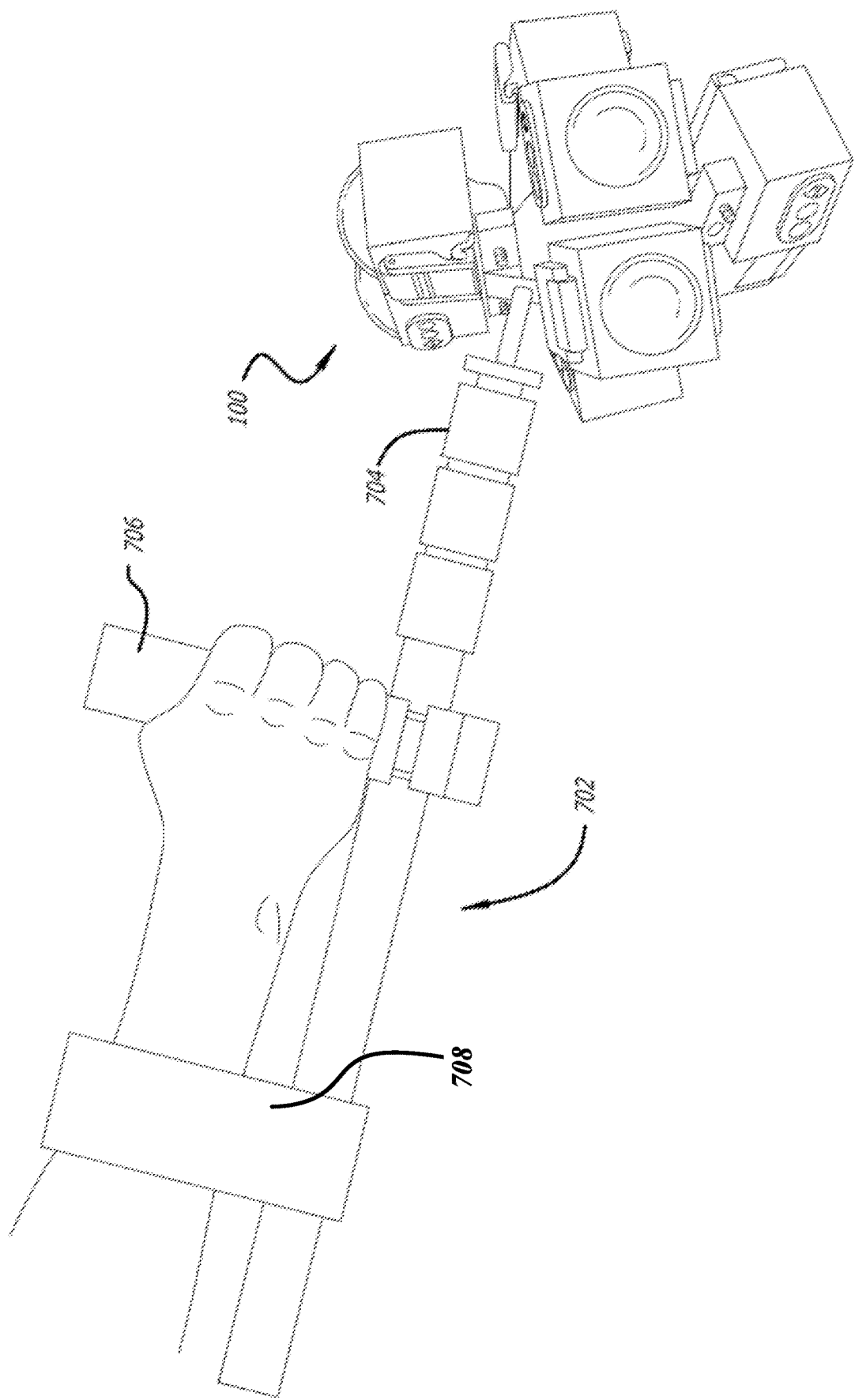
FIG. 7 is a side view of the system assembly including a handle assembly coupled to the frame.
Figure 8:
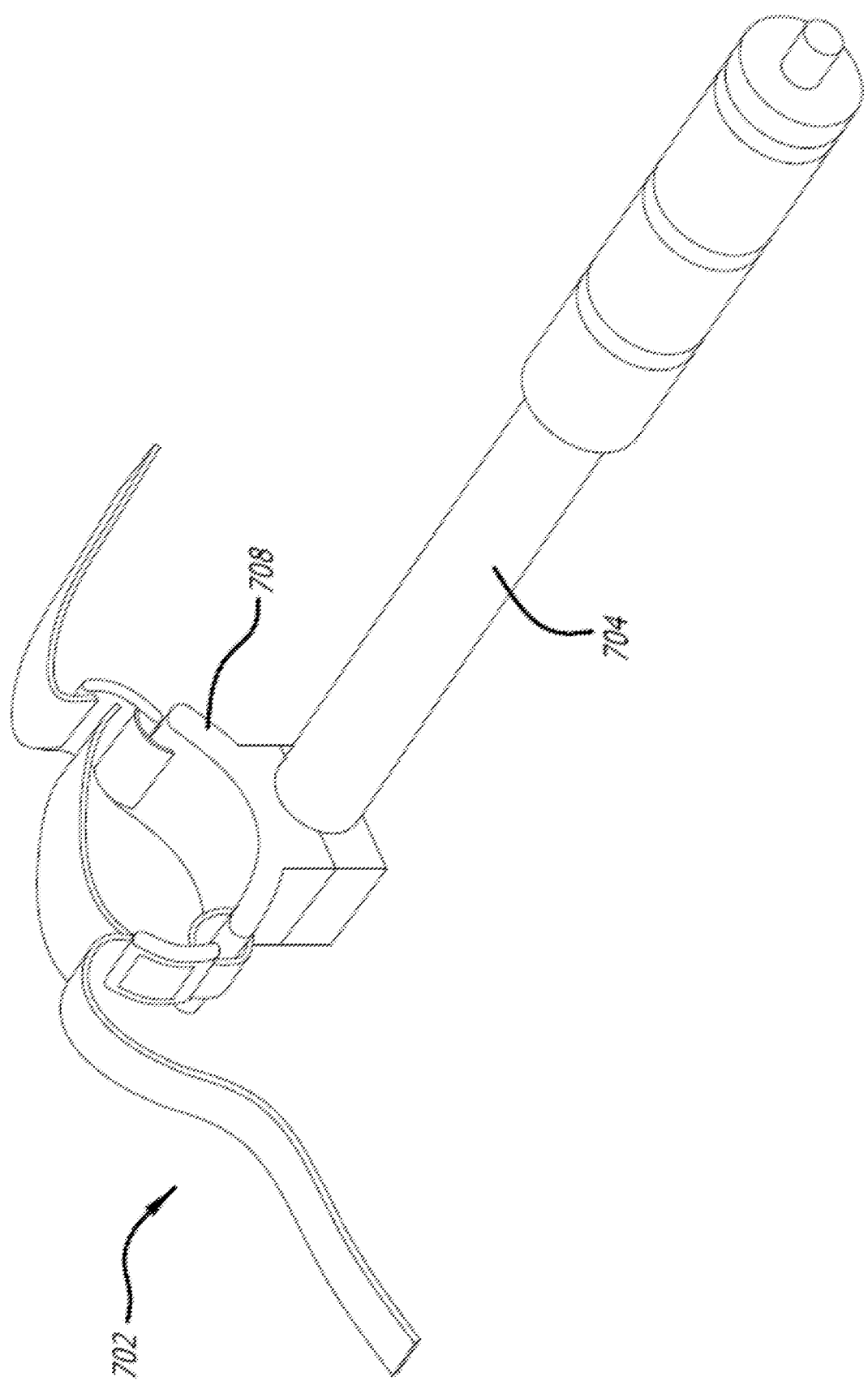
FIG. 8 is an isometric view of the handle assembly without the hand grip attached to the rod.

Turning now to FIGS. 7 and 8, the system assembly 100 can further include a handle assembly 702 coupled to the handle attachment feature 318 of the frame 102. In at least one embodiment, the handle assembly 702 may include a fastening element, such as a bolt, which may be coupled to the aperture of the handle attachment feature 318, such as by screwing the bolt of the handle assembly 702 into a receiving portion of the handle attachment feature 318. It will be apparent, however, that any other methods of joining the handle assembly 702 to the handle attachment feature 318 may be employed, for example by permanent welding, adhesive, locking pin, and various other interconnections as known in the art. The handle assembly 702 may include a rod 704 with at least one hand grip 706 coupled to the rod 704 (as shown in FIG. 7), and an arm band 708 also coupled to the rod 704 (as shown in FIGS. 7 and 8).

Figure 9:
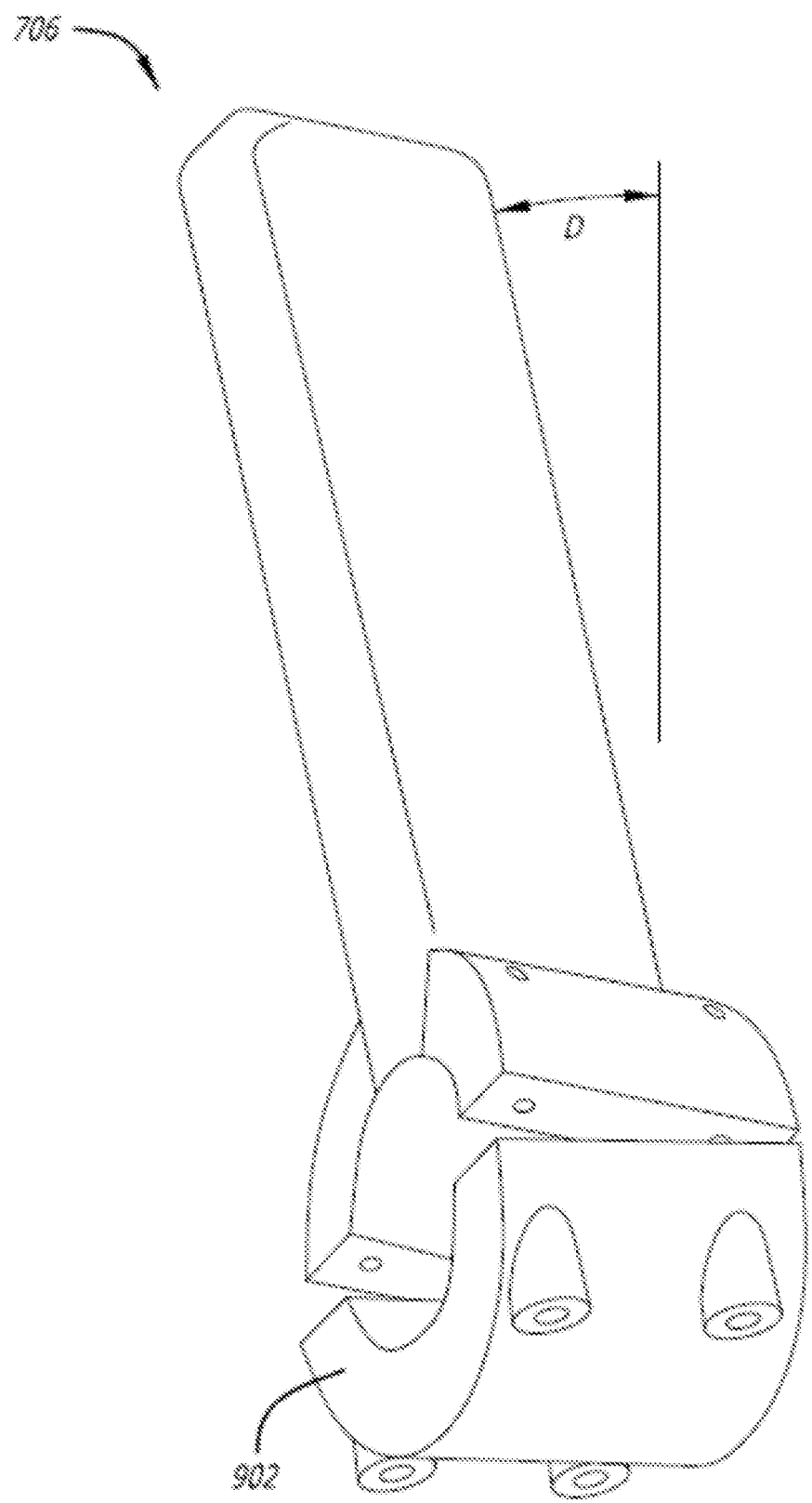
FIG. 9 is an isometric view of the hand grip according to at least one example.

FIG. 9 is an isometric view of the hand grip 706 according to at least one example. As shown, the hand grip 706 includes means for affixing the hand grip 706 to the rod 704. In the depicted example, a clamp 902 is employed to couple the hand grip 706 to the rod 704. In one or more other embodiments, the hand grip 706 may be coupled to the rod 704 by bolting, welding, gluing, forming integral to the rod 704, or any other means for coupling the hand grip 706 to the rod 704. The hand grip 706 may extend from the rod 704 at an angle orthogonal to the rod 704, or may be angled at an angle 'D'. In one or more embodiments, the angle 'D' may be between about 5° and 15° from vertical.

Figure 10:
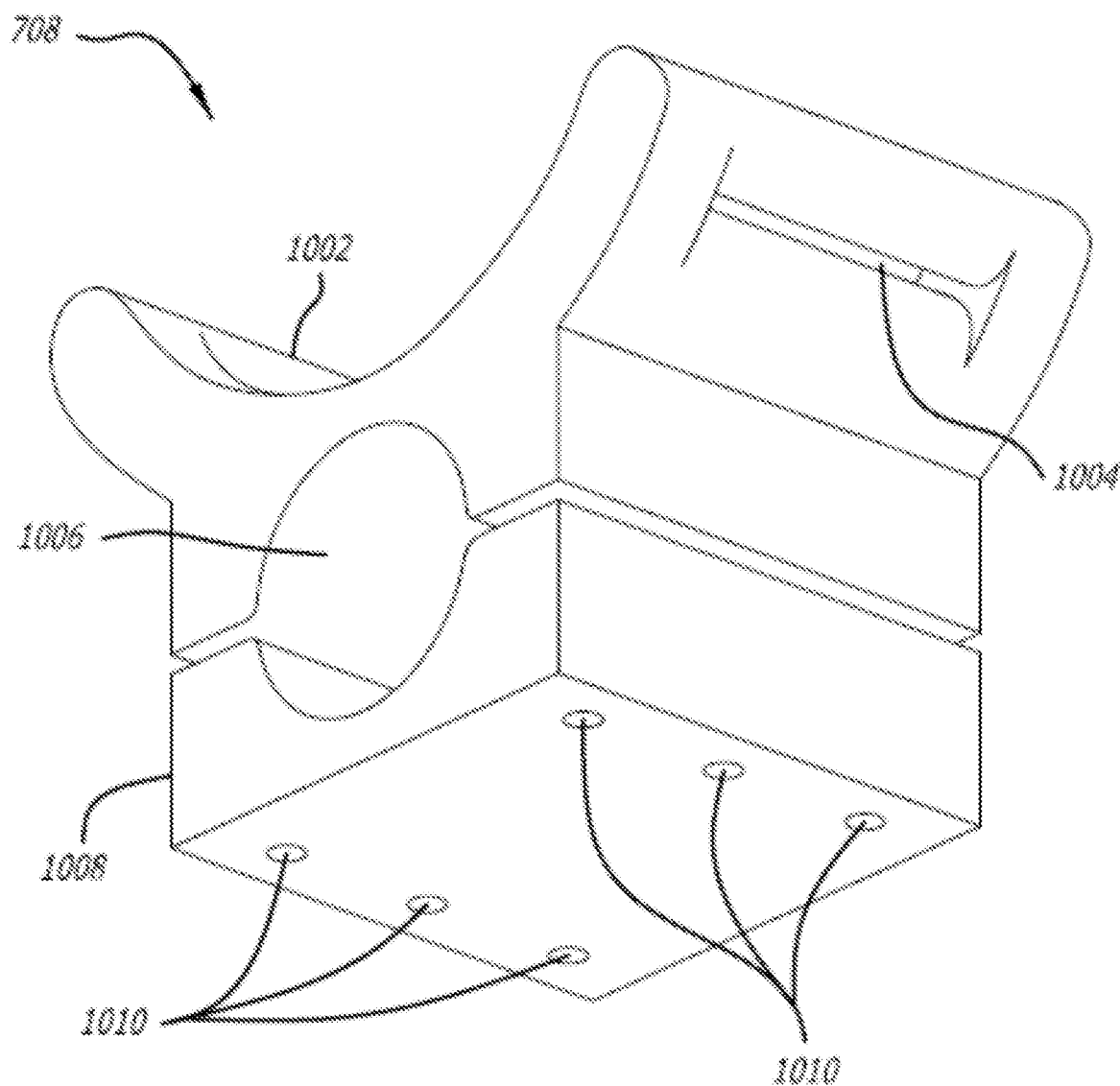
FIG. 10 is an isometric view of a part of the arm band according to at least one embodiment.

FIG. 10 is an isometric view of a part of the arm band 708 according to at least one embodiment. As shown, the arm band 708 may include an arm cup 1002 configured for a user to position their arm therein. An arm strap slot 1004 may also be included, the arm strap slot 1004 configured to receive a strap through the slot 1004. The arm band 708 can further include a strap (not shown), which can be utilized to strap a user's arm into the arm cup 1002, as shown in FIG. 8. An aperture 1006 may be formed between the arm cup 1002 and a clamp block 1008. The aperture 1006 is configured to receive the rod 704 therein, and the clamp block 1008 facilitates clamping the arm band 708 to the rod 704 by tightening bolts or screws in the clamp block holes 1010.

In some embodiments, the frame 102/202 may be made from a material that provides a desired buoyancy in the intended water environment. In other embodiments, one or more buoyancy components may be coupled to the frame 102/202 and/or to the handle assembly 702. In some embodiments, sufficient buoyancy components may be included so the system assembly 100 is at least substantially neutrally buoyant in the intended use environment. The necessary buoyancy components to achieve neutral buoyancy may change based on the underwater environment in which the system will be utilized (e.g., fresh water, salt water, depth of use).

Figure 11:
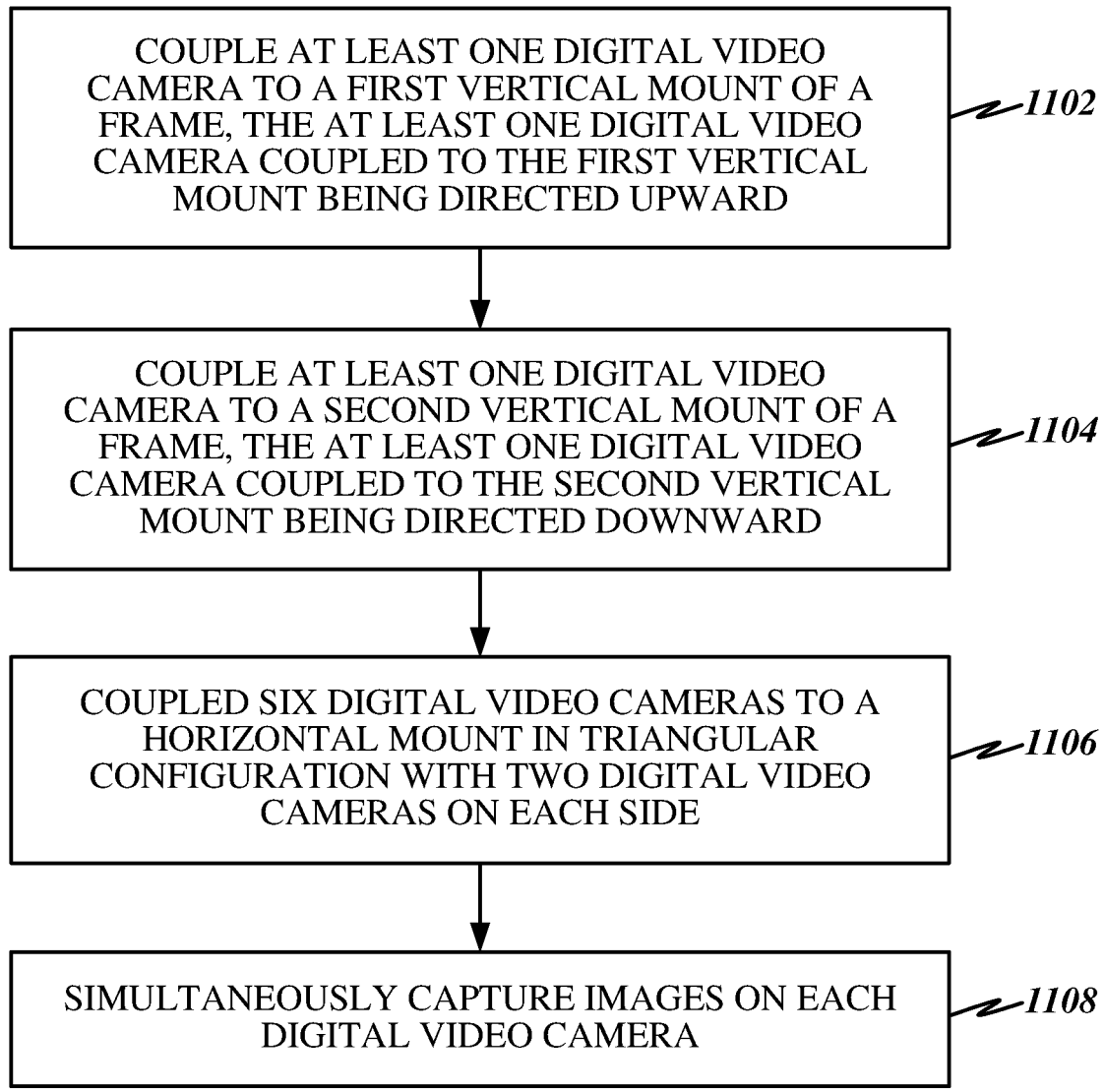
FIG. 11 is a flow diagram depicting an example of capturing stereoscopic 360° digital images underwater according to at least one implementation of the present disclosure.

Additional embodiments of the present disclosure include methods of capturing digital three-dimensional 360° images, which may include video images and/or still images. FIG. 11 is a flow diagram depicting an example of capturing stereoscopic 360° digital images underwater according to at least one implementation of the present disclosure. With reference to FIGS. 1, 2, 3, and 11, at least one digital video camera may be coupled to a first vertical mount 302 of a frame 102/202, with the at least one digital video camera directed upward at 1102. In some implementations, just a single digital video camera may be coupled to the first vertical mount 302. In other implementations, two digital video cameras may be coupled to the first vertical mount 302.

At 1104, at least one digital video camera may be coupled to a second vertical mount 304 of the frame 102/202, with the at least one digital video camera directed downward. In some implementations, just a single digital video camera may be coupled to the second vertical mount 304. In other implementations, two digital video cameras may be coupled to the second vertical mount 304.

At 1106, six digital video cameras may be coupled to a horizontal mount 306 in a triangular configuration with two digital video cameras on each side.

With all the digital video cameras coupled to the frame 102/202, each digital video camera can simultaneously capture images at 1108. For example, each digital video camera may capture images within its respective field of view simultaneous to the other digital video cameras capturing images in their respective fields of view. As noted previously, the digital video cameras may capture images employing an ultra-wide-angle lens in one or more implementations. In at least some embodiments, the ultra-wide-angle lens may be at least 220°, although the effective field of view for a given lens is typically reduced in an underwater environment compared to what is available in air environments. As noted herein, the digital video cameras may be mounted such that the interaxial distances between adjacent digital video cameras may be between about 62 mm and about 100 mm.

Figure 12:
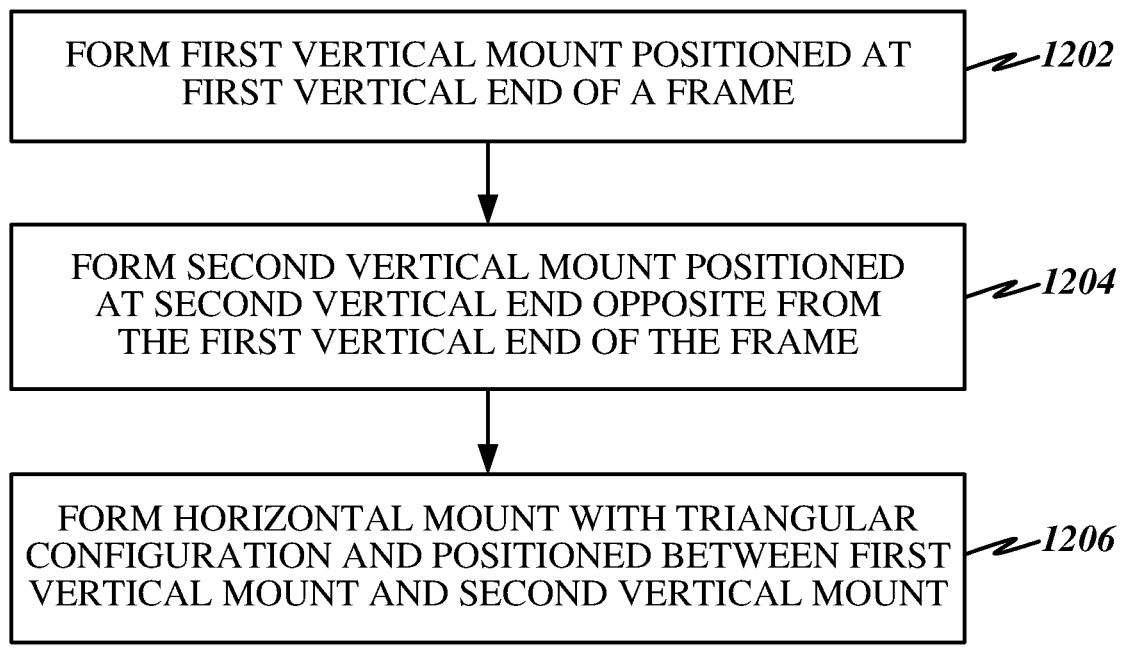
FIG. 12 is a flow diagram depicting select operations associated with at least one implementation of a method of making a stereoscopic 360° video recording system.

Yet further embodiments of the present disclosure include methods of making stereoscopic 360° video recording systems and assemblies. FIG. 12 is a flow diagram depicting select operations associated with at least one implementation of a method of making a stereoscopic 360° video recording system. Such methods generally include the forming of a frame, such as the frame 102 or 202. More specifically, and with reference to FIGS. 1, 2, 3, and 12, a first vertical mount 302 may be formed at 1202. The first vertical mount 302 may be positioned at a first vertical end of a frame 102/202.

At 1204, a second vertical mount 304 may be formed at a second vertical end opposite from the first vertical end of the frame 102/202. Further, at 1206, a horizontal mount 306 may be formed with a triangular configuration as discussed previously herein. The horizontal mount 306 may be positioned between the first vertical mount 302 and the second vertical mount 304.

In some implementations, the frame 102/202 including the first vertical mount 302, the second vertical mount 304, and the horizontal mount 306 may be formed from a material that provides a desired buoyancy in the intended water environment. For example, the desired buoyancy may be selected so the system assembly 100 is at least substantially neutrally buoyant in the intended use environment.

According to various implementations, digital video cameras and/or camera enclosures 104/204 may be coupled to the first vertical mount 302, the second vertical mount 304, and the horizontal mount 306 as described herein.

While the above discussed aspects, arrangements, and embodiments are discussed with specific details and particularity, one or more of the components, steps, features and/or functions illustrated in FIGS. 1, 2, 3, 4, 5, 6, 7, 8, 9, 10, 11, and/or 12 may be rearranged and/or combined into a single component, step, feature or function or embodied in several components, steps, or functions. Additional elements, components, steps, and/or functions may also be added or not utilized without departing from the present disclosure.

While features of the present disclosure may have been discussed relative to certain embodiments and figures, all embodiments of the present disclosure can include one or more of the advantageous features discussed herein. In other words, while one or more embodiments may have been discussed as having certain advantageous features, one or more of such features may also be used in accordance with any of the various embodiments discussed herein. In similar fashion, while exemplary embodiments may have been discussed herein as device, system, or method embodiments, it should be understood that such exemplary embodiments can be implemented in various devices, systems, and methods.

Also, it is noted that at least some implementations have been described as a process that is depicted as a flowchart or a flow diagram. Although a flowchart may describe the operations as a sequential process, many of the operations can be performed in parallel or concurrently. In addition, the order of the operations may be re-arranged. A process is terminated when its operations are completed.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A video recording system assembly, comprising:
a frame, including a first vertical mount located at a first vertical end and forming a first vertical plane, a second vertical mount located at a second vertical end opposite from the first vertical end and forming a second vertical plane that is parallel with the first vertical plane, a horizontal mount located between the first vertical mount and the second vertical mount and forming a horizontal plane that is orthogonal to the first vertical plane and the second vertical plane, and a handle attachment feature positioned between the first vertical mount and the horizontal mount, the handle attachment feature comprising an aperture positioned at a fixed angle between 20° and 40° from vertical, wherein vertical extends between the first vertical end and the second vertical end;

at least one digital video camera coupled to the first vertical mount;

at least one digital video camera coupled to the second vertical mount; and six digital video cameras coupled to the horizontal mount in a triangular configuration, with two digital video cameras on each side.

2. The video recording system assembly of claim 1, wherein:

each of the plurality of digital video cameras coupled to the horizontal mount are positioned at a first interaxial distance from adjacent digital cameras on both the right and left sides.

3. The video recording system assembly of claim 2, wherein an interaxial distance between the at least one digital video camera coupled to the first vertical mount and at least one digital video camera coupled to the horizontal mount is at least substantially equal to the first interaxial distance.

4. The video recording system assembly of claim 2, wherein:

two digital video cameras are coupled to the first vertical mount positioned at the first interaxial distance from each other; and two digital video cameras are coupled to the second vertical mount positioned at the first interaxial distance from each other.

5. The video recording system assembly of claim 1, further comprising a handle assembly coupled to the handle attachment feature of the frame, the handle assembly comprising:

a rod including a first longitudinal end and an opposing second longitudinal end, wherein the first longitudinal end is coupled to the frame;

an arm band coupled to the rod near the second longitudinal end; and a hand grip coupled to the rod between the first longitudinal end and the arm band.

6. A method of capturing 360° digital images, comprising:

coupling at least one digital video camera to a first vertical mount of a frame, wherein the at least one video camera coupled to the first vertical mount is directed upward in a first vertical plane;

coupling at least one digital video camera to a second vertical mount of the frame, wherein the at least one digital video camera coupled to the second vertical mount is directed downward in a second vertical plane that is parallel to the first vertical plane;

coupling six digital video cameras to a horizontal mount of the frame in a triangular configuration with two digital video cameras on each side, wherein two digital video cameras are directed in a horizontal plane that is orthogonal to the first vertical plane and the second vertical plane;

coupling a handle assembly to a handle attachment feature of the frame, the handle attachment feature positioned between the first vertical mount and the horizontal mount and including an aperture positioned at a fixed angle between 20° and 40° from vertical, wherein vertical extends between the first vertical mount and the second vertical mount; and simultaneously capturing images on each digital video camera.

7. The method of claim 6, further comprising:

utilizing the handle assembly to maneuver the frame under water with each of the digital video cameras coupled thereto.

8. The method of claim 6, wherein coupling the six digital video cameras to the horizontal mount comprises:

coupling the six digital video cameras with a first interaxial distance between 62 millimeters and 100 millimeters from adjacent digital video cameras.

9. The method of claim 6, simultaneously capturing images on each digital video camera comprises simultaneously capturing images on each digital video camera employing an ultra-wide-angle lens of at least 220°.

10. The method of claim 6, wherein:

coupling at least one digital video camera to a first vertical mount of a frame comprises coupling two digital video cameras to the first vertical mount of the frame, the two video cameras coupled to the first vertical mount being directed upward;

coupling at least one digital video camera to a second vertical mount of the frame comprises coupling two digital video cameras to the second vertical mount of the frame, the two digital video cameras coupled to the second vertical mount being directed downward.

11. A method of making a video recording system, comprising:

forming a first vertical mount positioned at a first vertical end of a frame in a first vertical plane;

forming a second vertical mount positioned at a second vertical end opposite from the first vertical end of the frame in a second vertical plane that is parallel with the first vertical plane;

forming a horizontal mount with a triangular configuration, the horizontal mount positioned between the first vertical mount and the second vertical mount and forming a horizontal plane that is orthogonal to the first vertical plane and the second vertical plane; and forming a handle attachment feature positioned between the first vertical mount and the horizontal mount, the handle attachment feature including an aperture formed with a secured angle between 20° and 40° from vertical, wherein vertical extends between the first vertical end of the frame and the second vertical end of the frame.

12. The method of claim 11, further comprising:

coupling at least one digital video camera to the first vertical mount of the frame, the at least one digital video camera coupled to the first vertical mount being directed upward;

coupling at least one digital video camera to the second vertical mount of the frame, the at least one digital video camera coupled to the second vertical mount being directed downward; and coupling six digital video cameras to the horizontal mount with two digital video cameras on each side of the triangular configuration.

13. The method of claim 12, wherein coupling the six digital video cameras to the horizontal mount comprises:

coupling each of the six digital video cameras to the horizontal mount oriented upside-down compared to an immediately adjacent digital video camera with which each digital video camera is paired as a stereo camera pair.

14. The method of claim 11, further comprising:
coupling at least one camera enclosure to the first vertical mount of the frame;
coupling at least one camera enclosure to the second vertical mount of the frame; and
coupling six camera enclosures to the horizontal mount with two camera enclosures on each side of the triangular configuration.

15. The method of claim 11, wherein forming the first vertical mount, forming the second vertical mount, and forming the horizontal mount comprises:
forming the first vertical mount, forming the second vertical mount, and forming the horizontal mount from a material selected to provide a specific buoyancy in a particular water environment.

16. A video recording system assembly, comprising:
a frame, including a first vertical mount located at a first vertical end and forming a first vertical plane, a second vertical mount located at a second vertical end opposite from the first vertical end and forming a second vertical plane that is parallel with the first vertical plane, a horizontal mount positioned between the first vertical mount and the second vertical mount and forming a horizontal plane that is orthogonal to the first vertical plane and the second vertical plane; and a handle attachment feature positioned between the first vertical mount and the horizontal mount, the handle attachment feature including an aperture positioned at a secured angle between 20° and 40° from vertical, wherein vertical extends between the first vertical end and the second vertical end;
at least one waterproof camera enclosure coupled to the first vertical mount;
at least one waterproof camera enclosure coupled to the second vertical mount; and
six waterproof cameras enclosures coupled to the horizontal mount in a triangular configuration, with two camera enclosures on each side.

17. The video recording system assembly of claim 16, further comprising a respective digital video camera disposed within each waterproof camera enclosure.

18. The video recording system assembly of claim 16, further comprising a heat-conductive material within a portion of each camera enclosure and positioned between a portion of the digital video camera and the camera enclosure.

19. The video recording system assembly of claim 16, further comprising a desiccant material disposed within each camera enclosure.

20. The video recording system assembly of claim 16, further comprising a handle assembly coupled to the handle attachment feature of the frame, the handle assembly comprising:
a rod including a first longitudinal end and an opposing second longitudinal end, wherein the first longitudinal end is coupled to the frame;
an arm band coupled to the rod near the second longitudinal end; and
a hand grip coupled to the rod between the first longitudinal end and the arm band.

\* \* \* \* \*